US006438184B1

(12) United States Patent
Nayler (10) Patent No.: US 6,438,184 B1
(45) Date of Patent: Aug. 20, 2002

(54) APPARATUS AND METHOD FOR ADJUSTING AN INPUT GAIN AND COMPARATOR THRESHOLD VALUE WITHIN AN ACCESS IDENTIFIER INTERVAL ON A TELEPHONE LINE MEDIUM

(75) Inventor: Colin Nayler, Sunnyvale, CA (US)

(73) Assignee: Sunnyvale Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/228,979

(22) Filed: Jan. 12, 1999

(51) Int. Cl.[7] ............................................... H04L 27/08
(52) U.S. Cl. ..................................... 375/345; 455/234.1
(58) Field of Search ................................. 375/219, 220, 375/222, 287, 288, 345, 377; 455/232.1, 234.1, 245.1, 73; 370/241, 464, 466

(56) References Cited

U.S. PATENT DOCUMENTS

| | | | | |
|---|---|---|---|---|
| 5,963,539 A | * | 10/1999 | Webber, Jr. et al. | 370/213 |
| 6,094,441 A | * | 7/2000 | Jung et al. | 370/446 |
| 6,097,732 A | * | 8/2000 | Jung | 370/446 |
| 6,292,517 B1 | * | 9/2001 | Jeffress et al. | 375/287 |

* cited by examiner

Primary Examiner—Stephen Chin
Assistant Examiner—Chieh M. Fan (57) ABSTRACT

A physical layer transceiver of a home network station connected to a telephone medium has an architecture enabling adaptation of detection circuitry based on received network signals to enable reliable recovery of data signals. The physical layer transceiver includes an input amplifier that amplifies network signals according to one of three gain settings set by a receiver gain control signal. A signal conditioning circuit includes an envelope detector configured for outputting an envelope of the amplified received signal, and an energy detector configured for outputting an energy signal of the amplified received signals. The envelope signal and the energy signal are supplied to slicer threshold circuits, configured for outputting noise, peak, data event and energy event signals based on noise threshold, peak threshold, data transition threshold, and energy threshold signals, respectively. A digital controller controls the input amplifier gain and the threshold values, and adjusts the gain and threshold values based on the noise event signal and the peak event signal within an access ID (AID) interval. In particular, the digital controller adjusts the input amplifier gain during a first part of the AID interval, and adjusts the peak threshold and the data transition threshold during a second part of the AID interval by using the slicer threshold circuits for ternary searching of the peak of the detected envelope signal.

19 Claims, 7 Drawing Sheets

APPARATUS AND METHOD FOR ADJUSTING AN INPUT GAIN AND COMPARATOR THRESHOLD VALUE WITHIN AN ACCESS IDENTIFIER INTERVAL ON A TELEPHONE LINE MEDIUM

FIELD OF THE INVENTION

The present invention relates to network interfacing, and more particularly, to methods and systems for controlling transmission of data between network stations connected to a telephone line medium.

DESCRIPTION OF THE RELATED ART

Local area networks use a network cable or other media to link stations on the network. Each local area network architecture uses a media access control (MAC) enabling network interface cards at each station to share access to the media.

Conventional local area network architectures use media access controllers operating according to half-duplex or full duplex Ethernet (ANSI/IEEE standard 802.3) protocol using a prescribed network medium, such as 10 BASE-T. Newer operating systems require that a network station to be able to detect the presence of the network. In an Ethernet 10 BASE-T environment, the network is detected by the transmission of a link pulse by the physical layer (PHY) transceiver. The periodic link pulse on the 10 BASE-T media is detected by a PHY receiver, which determines the presence of another network station transmitting on the network medium based on detection of the periodic link pulses. Hence, a PHY transceiver at Station A is able to detect the presence of Station B, without the transmission or reception of data packets, by the reception of link pulses on the 10 BASE-T medium from the PHY transmitter at Station B.

Efforts are underway to develop an architecture that enables computers to be linked together using conventional twisted pair telephone lines instead of established local area network media such as 10 BASE-T. Such an arrangement, referred to herein as a home network environment, provides the advantage that existing telephone wiring in a home may be used to implement a home network environment. However, telephone lines are inherently noisy due to spurious noise caused by electrical devices in the home, for example dimmer switches, transformers of home appliances, etc. In addition, the twisted pair telephone lines suffer from turn-on transients due to on-hook and off-hook and noise pulses from the standard POTS telephones, and electrical systems such as heating and air conditioning systems, etc.

An additional problem in telephone wiring networks is that the signal condition (i.e., shape) of a transmitted waveform depends largely on the wiring topology. Numerous branch connections in the twisted pair telephone line medium, as well as the different associated lengths of the branch connections, may cause multiple signal reflections on a transmitted network signal. Telephone wiring topology may cause the network signal from one network station to have a peak-to-peak voltage on the order of 10 to 20 millivolts, whereas network signals from another network station may have a value on the order of one to two volts. Hence, the amplitude and shape of a received pulse may be so distorted that recovery of a transmit clock or transmit data from the received pulse becomes substantially difficult.

The variation in a received network signal creates problems in determining an optimum threshold comparator value in comparators used to recover the network clock and data signals from the received network signals. One proposal is to adapt the current threshold levels during an access ID (AID) time, where a binary search is used to determine the successive significant bit value for the comparator circuit threshold based on successive received pulses. Hence, the eight pulses received during the AID interval are used to set an eight-bit threshold level for a comparator. However, the wide range of peak voltages in the incoming network signal may cause saturation of the receiver circuitry if the received network signal is substantially large, for example on the order of two volts peak voltage. Conversely, a network signal having a peak voltage on the order of 10 to 20 millivolts requires a receiver having a substantially wide dynamic range, else the smaller network signals cannot be distinguished from noise signals.

SUMMARY OF THE INVENTION

There is a need for a network station having a physical layer transceiver capable of reliably recovering data from a received network signal on a telephone line medium.

There is also a need for a physical layer transceiver capable of adapting to a wide dynamic range of received network signals in a cost-efficient manner.

There is also a need for an arrangement in a physical transceiver that enables an input amplifier gain and comparator threshold values to be set within an access identifier interval without loss of resolution in the comparator threshold values.

These and other needs are obtained by the present invention, where a digital controller is configured for determining a gain setting for the input amplifier during a first portion of the access identifier interval, and determining the data threshold value and a peak threshold value for first and second comparator circuits within a second portion of the access identifier interval. The data threshold value and peak threshold values are determined within the second portion of the access identifier interval by a comparison of the received network signals to threshold values supplied to first and second comparator circuits normally used for peak detection and data (e.g., mid-point) detection, respectively.

According to one aspect of the present invention, a network station configured for receiving network signals from another network station via a telephone line medium includes an input amplifier for selectively amplifying a received network signal according to a selected one of a plurality of gain settings and outputting an amplified network signal, an envelope detector configured for outputting an envelope signal in response to the amplified network signal, first and second comparator circuits configured for outputting first and second comparison signals indicating whether the envelope signal exceeds first and second threshold values, respectively, and a digital controller. The digital controller is configured for setting the selected one gain setting and the first and second threshold values within a prescribed access identifier interval specified by a prescribed number of the received network signals from the telephone line medium. The digital controller determines the selected one gain setting during a first portion of the prescribed access identifier interval, and a peak threshold value and data threshold value for the respective first and second threshold values during a second portion of the prescribed access identifier interval, the peak threshold value substantially corresponding to a detected peak of the envelope signal. Use of an input amplifier for selectively amplifying a received network signal enables the physical layer transceiver to optimize reception of a data packet, eliminating the occurrence of input amplifier saturation and selectively amplifying network signals for improved sensitivity, balancing the need for a good signal to noise ratio using a high-sensitivity receiver. Moreover, the use of first and second comparator circuits enables the digital controller to identify a peak threshold value substantially corresponding to a detected peak of the envelope signal within a second portion of the prescribed access identifier interval. Hence, use of the first and second comparator circuits enables use of advanced searching techniques more efficient than binary search techniques, enabling determination of a peak threshold value in a minimal amount of time.

Another aspect of the present invention provides a method of configuring a network station transceiver for reception, from a telephone line medium, of network data signals contiguously following a prescribed number of network access identifier signal pulses defining an access identifier interval. The method includes determining a gain setting for an input amplifier, configured for outputting an amplified network signal to an envelope detector, within a first portion of the access identifier interval, and determining a data threshold value and a peak threshold value for first and second comparator circuits, configured for identifying whether an envelope signal generated based on the amplified network signal exceeds supplied threshold values, within a second portion of the access identifier interval.

Additional advantages and novel features of the invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
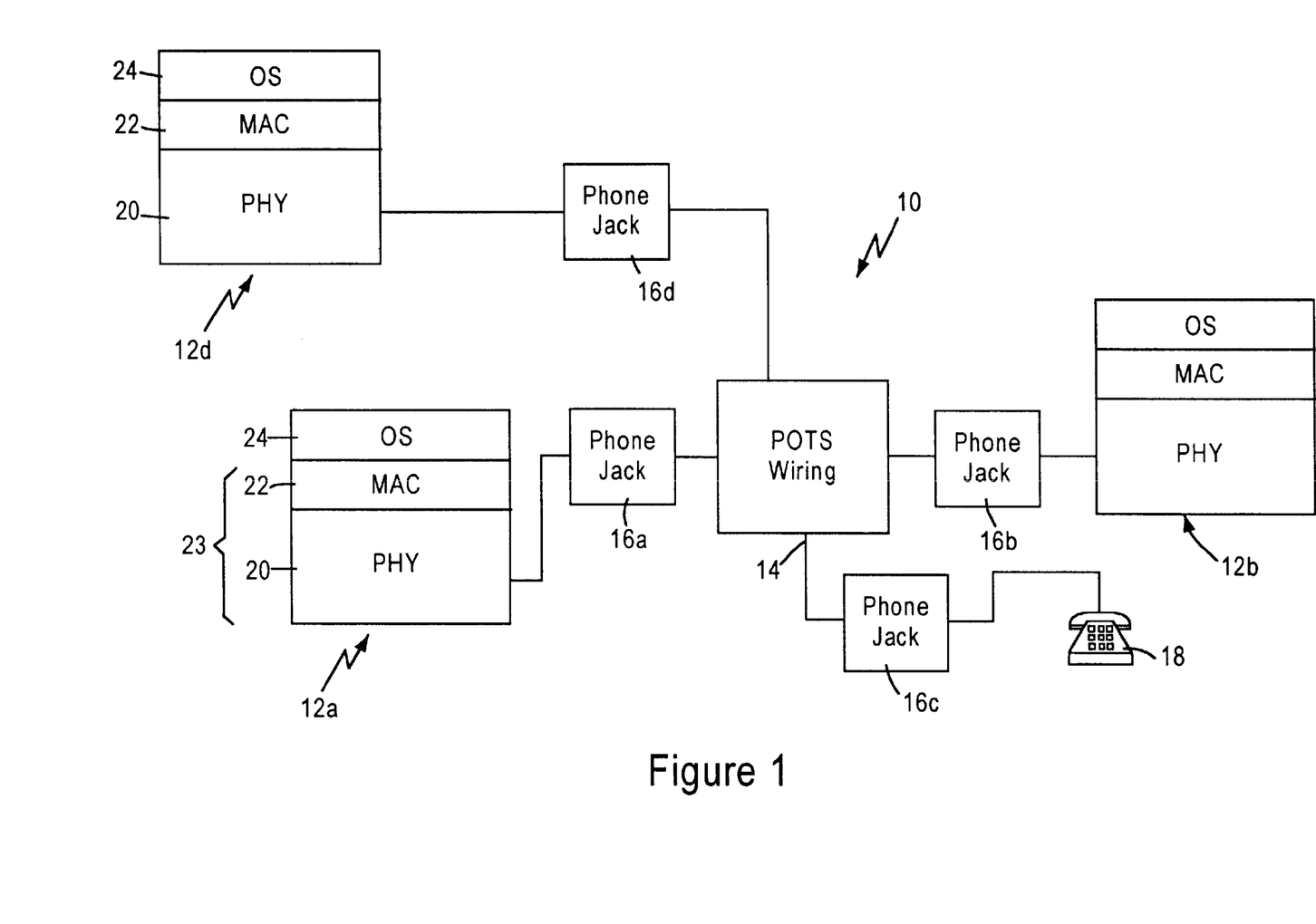
FIG. 1 is a block diagram illustrating a local area network deployed over residential twisted pair wiring.

FIG. 1 is a diagram of an Ethernet (IEEE 802.3) local area network 10 implemented in a home environment using twisted pair network media according to an embodiment of the invention. As shown in FIG. 1, the network 10 includes network stations 12a and 12b that are connected to a telephone line (twisted pair) wiring 14, via RJ-11 phone jacks 16a and 16b respectively. A telephone 18 connected to the RJ-11 phone jack 16c may continue to make phone calls while stations 12a and 12b are communicating.

As shown in FIG. 1, each network station 12, for example a personal computer, printer, or intelligent consumer electronics device, includes a physical layer (PHY) transceiver 20, a media access (MAC) layer 22, and an operating system (OS) layer that performs higher layer functions according to the OSI reference model.

Figure 2A:
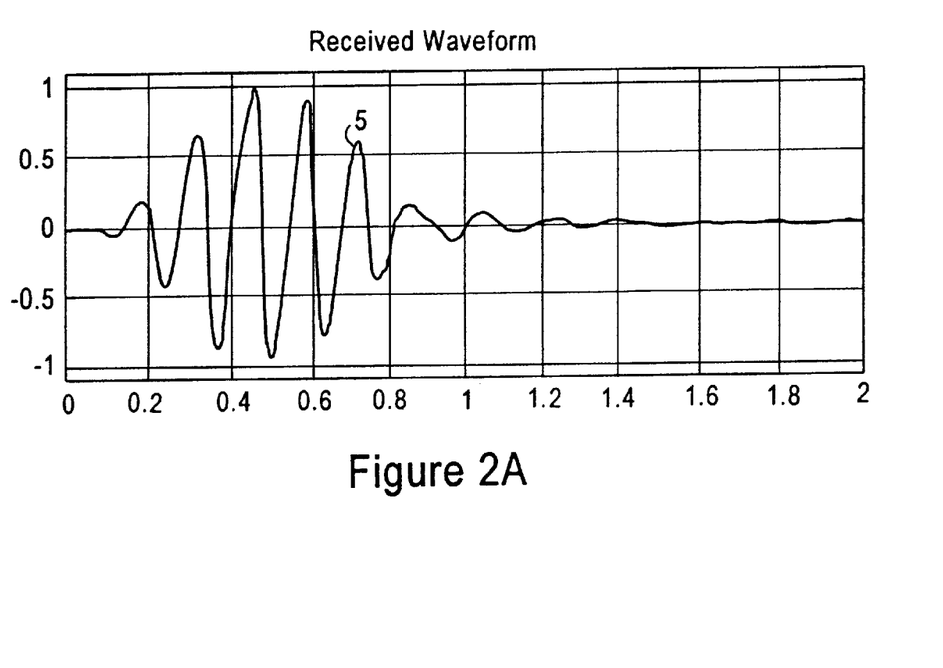
FIGS. 2A, 2B, 2C and 2D are diagrams illustrating processing of received waveforms by the physical layer transceiver of FIG. 1 according to an embodiment of the present invention.
Figure 2B:
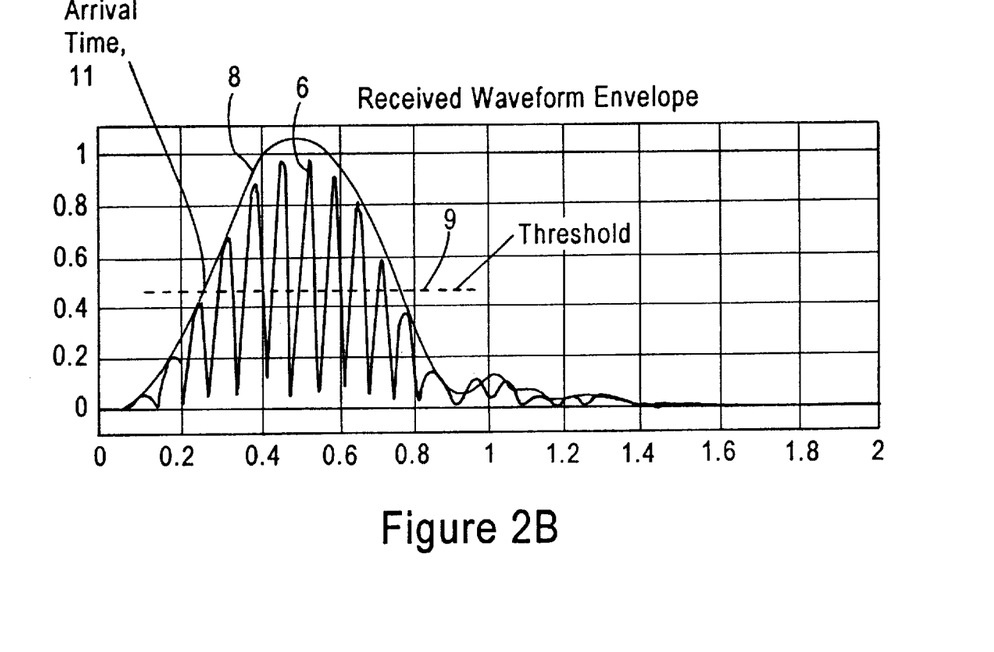

The stations 12a and 12b communicate by transmitting band limited pulses that carry network data modulated in the analog network signals. In particular, the physical layer transmitter transmits a band limited pulse 5, illustrated in FIG. 2A. The arrival position of a received pulse is detected using a waveform envelope 8 representing the absolute value 6 of the received signal, shown in FIG. 2B. The envelope 8 is supplied to a slicing circuit described below, having a threshold level 9 selected to identify the arrival position 11 of the received pulse. When the envelope 8 crosses the threshold level 9, the slicing circuit detects the arrival position 11 of the pulse as an event representing a data pattern. This event can be used to recover a transmit clock and transmit data from the received signal.

Figure 2C:
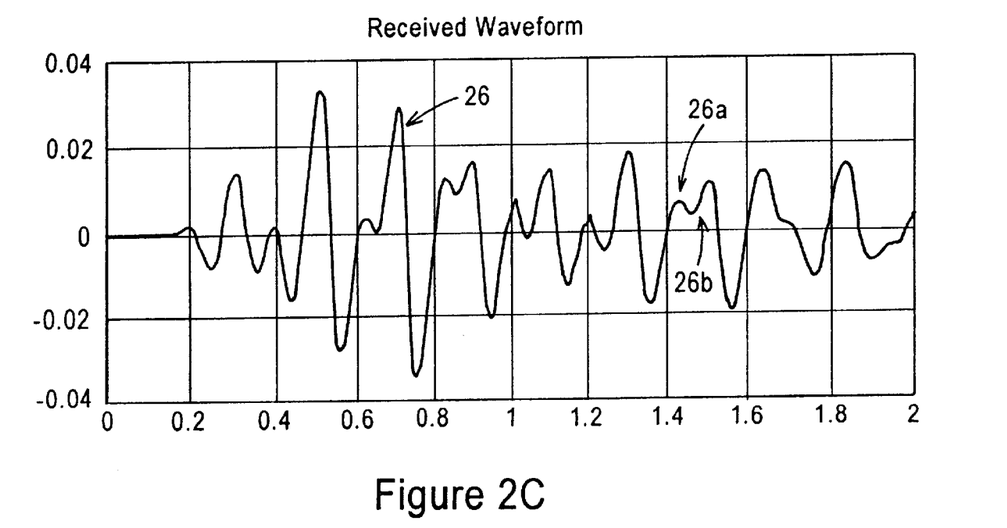
Figure 2D:
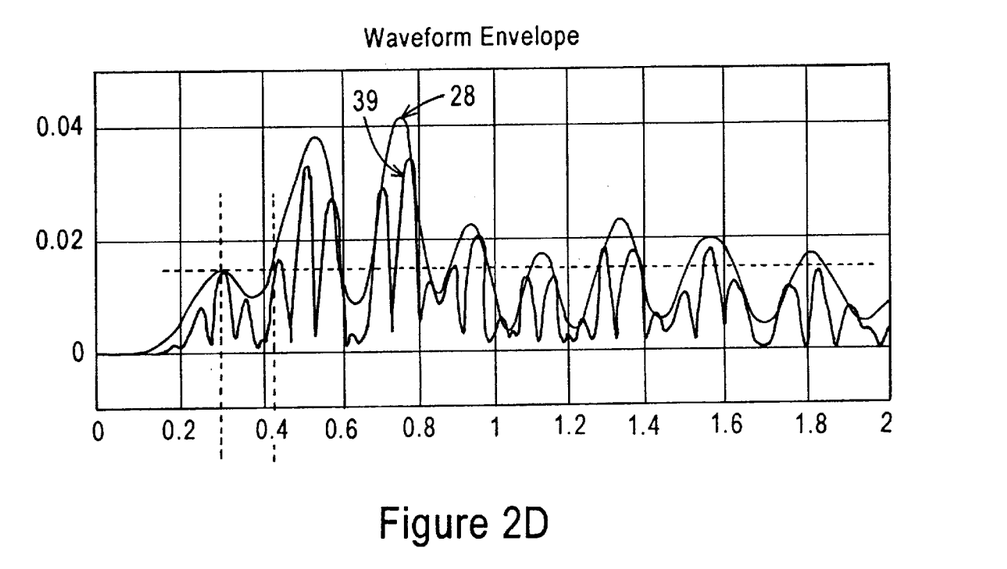

However, in telephone wire networks, the received envelope waveform depends largely on the wiring topology. As the wiring topology may cause multiple signal reflections, the shape of a received pulse may be so distorted that the envelope may have multiple localized maximum points. In addition, the wiring topology in the home network is variable. Hence the distortion of the received pulse is unpredictable, resulting in a waveform 26 as shown in FIG. 2C. As shown in FIG. 2C, the distorted waveform 26 of a received pulse signal has multiple localized maximum and minimum points 26a and 26b due to wiring topology. FIG. 2D illustrates the envelope waveform 28 of the distorted waveform 26. Hence, if a threshold value is not properly set for detection of a data pulse, a slicing circuit may identify multiple pulse positions at which crosses a threshold level. As a result, a unique time value for the position of a received pulse may not be detected resulting in data recover errors.

According to the disclosed embodiment, an adaptive physical layer transceiver architecture adaptively adjusts the signal processing circuitry on both the receive side and transmit side to optimize accurate recovery data from the transmitted network signals, and optimize transmitter performance to overcome adverse conditions due to home telephone wiring topology. In particular, the disclosed embodiment includes a digital controller 41 configured for determining a gain setting (RxGain) for an input amplifier during a first portion of an access identifier (AID) interval, and a data threshold value (D) and a peak threshold value (P) within a second portion of the access identifier interval. Since each network station transmits an access identifier preamble before transmitting a data packet, the physical layer transceiver can automatically reconfigure the receiver on a per-packet basis, optimizing the reception quality for each received data packet. Moreover, use of two comparator circuits enables detection of the envelope peak using search techniques that are more efficient than conventional binary search techniques. An overview of the physical layer transceiver architecture will first be provided, followed by a description of the arrangement for adjusting an input amplifier gain setting and comparator threshold values within an access identifier interval.

PHYSICAL LAYER ARCHITECTURE

Figure 3:
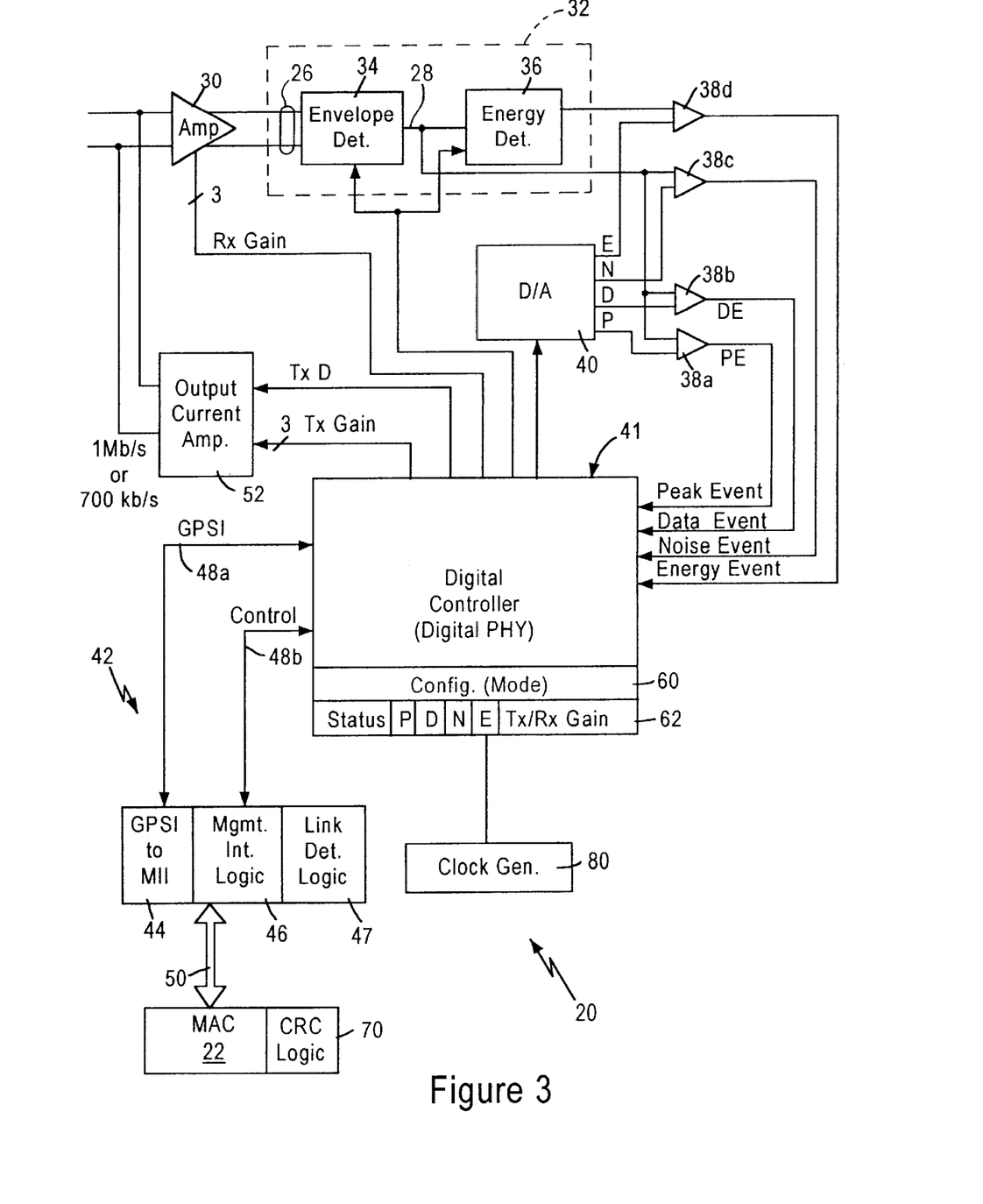
FIG. 3 is a block diagram illustrating the architecture of the physical layer transceiver of FIG. 1 according an embodiment of the present invention.

FIG. 3 is a block diagram of the physical layer transceiver 20 according to an embodiment of the present invention. As shown in FIG. 3, the physical layer transceiver 20 includes an input amplifier 30 for amplifying analog network received from the telephone medium, such as the network signals shown in FIG. 2C. As described below, the input amplifier 30 has a variable gain controlled by a 3-bit gain signal (RxGain) for amplifying received network signals. The physical layer transceiver 20 also includes a signal conditioning circuit 32 that includes an envelope detection circuit 34 and an energy detection circuit 36. The envelope detection circuit 34 generates the envelope signal 28 in response to the amplified received signal 26. For example, the envelope detector 34 includes an absolute value circuit (e.g., a rectifier circuit) that generates an absolute value signal 39 of the amplified received signal 26, and a low pass filter coupled to the rectifier circuit for filtering out high-frequency components the rectified signal, resulting in the envelope signal 28. The envelope signal 28 is output from the envelope detector 34 and supplied to the energy detector 36. The energy detector 36 includes an integrator which performs the mathematical process of integration over time to produce a signal proportional to energy of the received pulse signal.

As shown in FIG. 3, physical layer transceiver 20 also includes a plurality of slicer circuits 38, and a digital to analog converter 40 for supplying analog threshold signals to the slicer circuits 38. The physical layer transceiver also includes a digital controller 41 configured for controlling the digital analog converter 40 for outputting the threshold signal E, N, D, P, described below.

In particular, the digital controller 41 is configured for controlling the threshold values applied to the slicers 38a, 38b, 38c and 38d based on the signals supplied by the slicers 38 to the digital controller 41. In particular, slicer circuit 38a outputs a peak event signal indicating with respect to time whether the envelope signal 28 exceeds a peak threshold (P) supplied by the digital to analog converter 40 under the control of the digital controller 41. Slicer circuits 38b and 38c output data event signals and noise event signals indicating with respect to time whether the envelope signal 28 exceeds a data transition threshold (D) and a noise threshold (N) respectively. The slicer circuit 38d outputs an energy event signal indicating with respect to time whether the energy signal output by energy detector 36 exceeds an energy threshold (E) supplied by the D/A converter 40.

Hence, the slicer circuits 38a, 38b, and 38c output peak, data transition, and noise event signals indicating with respect to time whether the envelope signal 28 exceeds a peak threshold (P), a data transition threshold D), and a noise threshold (N), respectively. Slicer 38d, however, outputs an energy event signal indicating with respect to time whether the energy signal from the energy detector 36 exceeds an energy threshold (E).

The digital controller 41 controls the noise, peak and data transition thresholds based on the noise event signals and the peak signals output by the slicers 38c and 38a, respectively, and outputs digital data signals to the media access controller 22 via a media independent interface (MII) 50 based on either the energy event signals or the data event signals.

In particular, the digital controller 41 adjusts the gain of the amplifier 30, and the threshold values P, D, N, and E generated by the D to A converter 40 during an access ID (AID) interval. AID is a specific identifier which is unique for each network station 12. AID is a series of 8 pulses output from the PHY transceiver 20 of the transmitting station onto the telephone medium 14, where the time intervals between the first pulse and the successive 7 pulses define respective values. For example, assume a second pulse is output by the PHY transceiver 20 following a first pulse at time T1. If T1 equals 66 clock cycles (assuming a 116 nanosecond clock), the corresponding value is 00; if T1 equals 86, 106, or 126 clock cycles, the values are 01, 10, or 11, respectively, where the maximum interval between pulses is 128 clock cycles. The same arrangement is used to detect the values used in time intervals T2, T3, T4, T5, and T7. Hence, the presence of the valid AID can be determined by detecting a first pulse, and detecting a presence of 7 successive pulses using detection windows each having a duration of 128 clock cycles.

According to the disclosed embodiment, AID replaces the preamble conventionally used in 10 Base-T Ethernet (IEEE 802.3) systems. Hence, the digital controller 41 of the present invention uses the AID interval to selectively tune the input amplifier 30 to one of 8 different gain settings selected by the RxGain signal, and set the threshold values used by the slicer circuits 38 by supplying digital threshold values to the D/A converter 40. Once the digital controller 41 has tuned the input amplifier 30 and the threshold values of the slicer circuits 38, the digital controller 41 uses either the data transition event signals from the slicer circuit 38b or the energy event signal from the slicer circuit 38d for recovering the data signals, described below.

The physical layer transceiver also includes a transmitter portion 52 (e.g., an output current amplifier), that converts transmit data (TxD) to an analog network signal. The analog network signal is output at a selected one of 8 output gain values based on a 3-bit transmit gain (TxGain) signal output by the digital controller 41. Note that the receive gain (RxGain) signal and the transmit gain (TxGain) signal may have higher (e.g., 7-bit) values for more resolution if desired.

As shown in FIG. 3, the physical layer transceiver 20 also includes an output interface 42 including an MII to general purpose serial interface (GPSI) converter 44, management interface logic 46, and buses 48a and 48b. The bus 48a transfers transmit and receive data between the MAC 22 and the digital controller 41 in GPSI format. The converter 44 converts the GPSI format data to nibble-wide data for transfer to the MAC 22 via the MII 50. Similarly, transmit data from the MAC 22 supplied via the MII 50 is converted from nibble-wide data to GPSI format, and supplied to the digital controller 41 via the GPSI data bus 48a.

The output interface 42 also includes a control data bus 48b for transferring configuration data and status information between the digital controller 41 and the management interface logic 46. In particular, the management interface logic 46 is configured for storing configuration data, received from the MAC 22 via the MII 50, into the digital controller 41 at selected control registers 60. Note that the threshold value E for the energy detector slicer circuit 38d may be supplied by the management agent via the MII 50 and set in the configuration registers 60. The digital controller 41 also includes status registers 62 that include, for example, the threshold values for the threshold signals P, D, and E, and the 7-bit input and output amplifier gain control signals (RxGain, TxGain). Hence, a management agent (e.g., a link controller, described below) can access registers 60 and 62 for reading and writing of control information, and reading status information from the status registers 62. The interface 42 also includes link detection logic 47 for determining whether a valid link is detected on the network medium 14. If no valid AID is detected within three successive detection intervals, each having a preferred duration of about 800 milliseconds, the link status is sent to an invalid state. A valid AID may be either a link packet or a preamble for a data packet.

ADJUSTING INPUT GAIN AND THRESHOLD VALUES DURING AID INTERVAL

Figure 4:
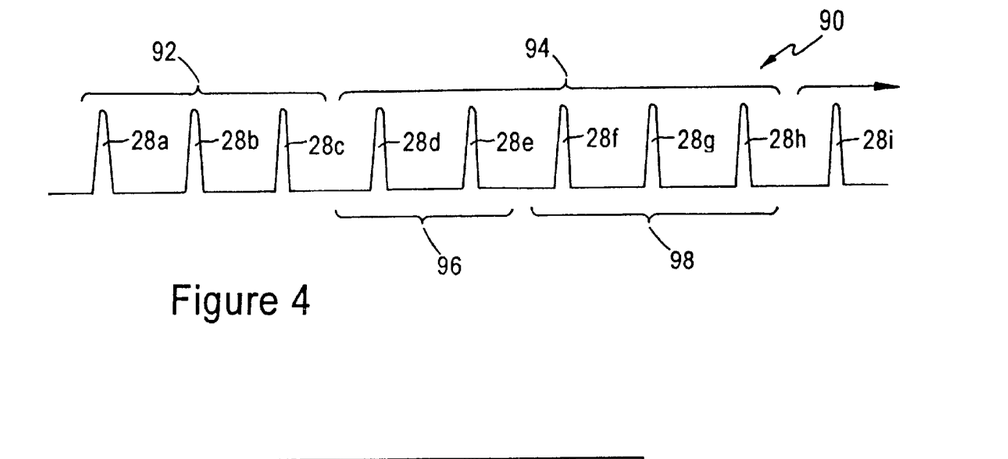
FIG. 4 is a diagram illustrating a sequence of network pulses defining an access identifier interval used to adjust input amplifier gain and threshold values according to an embodiment of the present invention.

FIG. 4 is a diagram of a sequence of envelope pulses 28 used to define an AID interval 90, used to adjust the physical layer transceiver 20 for reception of a data packet according to an embodiment of the present invention. As shown in FIG. 4, the AID interval 90 is defined by 8 envelope pulses 28a, 28b, 28c, . . . , 28h. The data packet transmission begins with the envelope pulse 28i contiguously following the last AID envelope pulse 28h. As described above, the 8 envelope pulses 28 generated by the envelope detector 34 in response to received network signals 5 are used to selectively tune the input amplifier 30 to one of 8 different gain settings specified by the RxGain signal, and set the threshold values used by the slicer circuits 38 by supplying digital threshold values to the D/A converter 40.

As described below, the digital controller 41 determines the gain setting (RxGain) for the input amplifier 30 within a first portion 92 of the access identifier interval 90. The digital controller 41 then determines the data threshold value (D) and peak threshold value (P) for the comparator circuits 38b and 38a, respectively, within a second portion 94 of the access identifier 90. As described below, the comparators 38a and 38b are used concurrently to establish detection regions for determining a peak of the envelope signal 28 using a ternary search technique using a first number 96 of envelope pulses 28 in the second portion, followed by a binary search using a second number 98 of the envelope pulses 28. As described below, the ternary search provides a more efficient convergence in identifying the peak of the envelope signal, enabling the digital controller 41 to determine approximately 3 bits (e.g., one of nine detection regions) of the 7-bit peak threshold value using only 2 envelope pulses 28d and 28e. The digital controller 41 completes determination of the peak threshold value using binary search techniques, using pulses 28f, 28g and 28h during interval 98, to enable the data slice level (D) to be stabilized for synchronization of a digital phase locked loop (PLL) in the digital phase locked loop controller 41.

Figure 5:
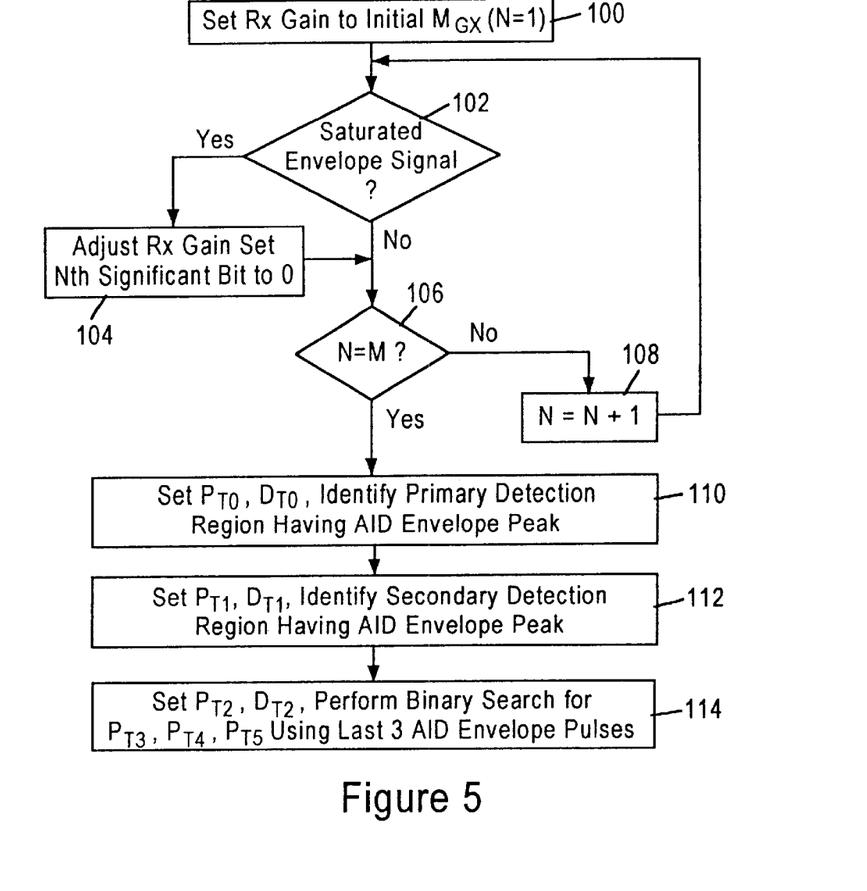
FIG. 5 is a flow diagram illustrating the method for configuring the network station transceiver according to an embodiment of the present invention.

FIG. 5 is a flow diagram of the method for configuring a network station transceiver by adjusting the receiver gain (RxGain) and the data and peak thresholds during a single AID interval according to an embodiment of the present invention. As shown in FIG. 5, the method begins in step 100 by the digital controller 41 setting the 3-bit receiver gain to an initial maximum (RxGain=111 binary), and setting an interval counter to 1 (N=1). The digital controller 41 then checks in step 102 whether a saturated envelope signal is detected, for example by determining if the envelope detector 34 generates an overflow signal, or by determining if the envelope signal 28 exceeds a maximum threshold value on any of the slicers 38 (e.g., MAX=255). In a majority of cases it is assumed that a saturated envelope signal will be detected in step 102 based on the receiver gain being initially set to the initial maximum, except if the envelope pulse 28a has a peak voltage of about 10 mV. If the digital controller 41 detects a saturated envelope signal, the digital controller 41 adjusts the receiver gain in step 104 by setting the Nth significant bit to 0. Hence, if N=1, then the digital controller 41 sets the receiver gain to RxGain=011 (binary).

The digital controller 41 then checks in step 106 whether the counter N=M, where M corresponds to the number of digital bits used to control the receiver gain (e.g., 3). If the counter value N does not equal M, the another bit of the receiver gain setting (RxGain) needs to be tested. Hence, the counter is incremented in step 108 and the process is repeated for the remaining significant bits of the receiver gain value. Hence, the digital controller 41 successively adjusts the corresponding significant bits of the maximum gain setting based on successive detection of a saturated envelope signal 28, where the bits 1, 2, 3 of the gain setting (RxGain) are selectively adjusted based on determining whether the envelope signals 28a, 28b, and 28c saturate the envelope detector 34, respectively. Hence, the first portion 92 of the access identifier interval 90 is used to determine the receiver gain (RxGain).

Once the appropriate receiver gain setting (RxGain) has been determined using the first group of envelope signals 28a, 28b and 28c, the physical layer transceiver 20 is thus optimized for reception of the network signals, since received network signals are amplified to within the dynamic range (i.e., linear region) of the physical layer transceiver 20, while ensuring that saturation does not occur. In addition, the selective gain adjustment may improve the signal to noise ratio if substantially large network signals are attenuated to fall within the linear region of the transceiver 20.

However, use of the first portion 92 of the AID interval 90 to determine the appropriate receiver gain limits the number of AID pulses that may be used to set the 7-bit peak threshold (P) and data (D) threshold values.

According to the disclosed embodiment, the peak threshold (P) and the data threshold (D) are selectively set to establish a plurality of detection regions within a dynamic range of the comparator circuits 38. In particular, the digital controller 41 sets the peak threshold and data threshold values to specific detection range threshold values, described below, for detecting the peak ($P_S$) of the envelope signal 28 within a dynamic range of the comparator circuits 38.

Figure 7:
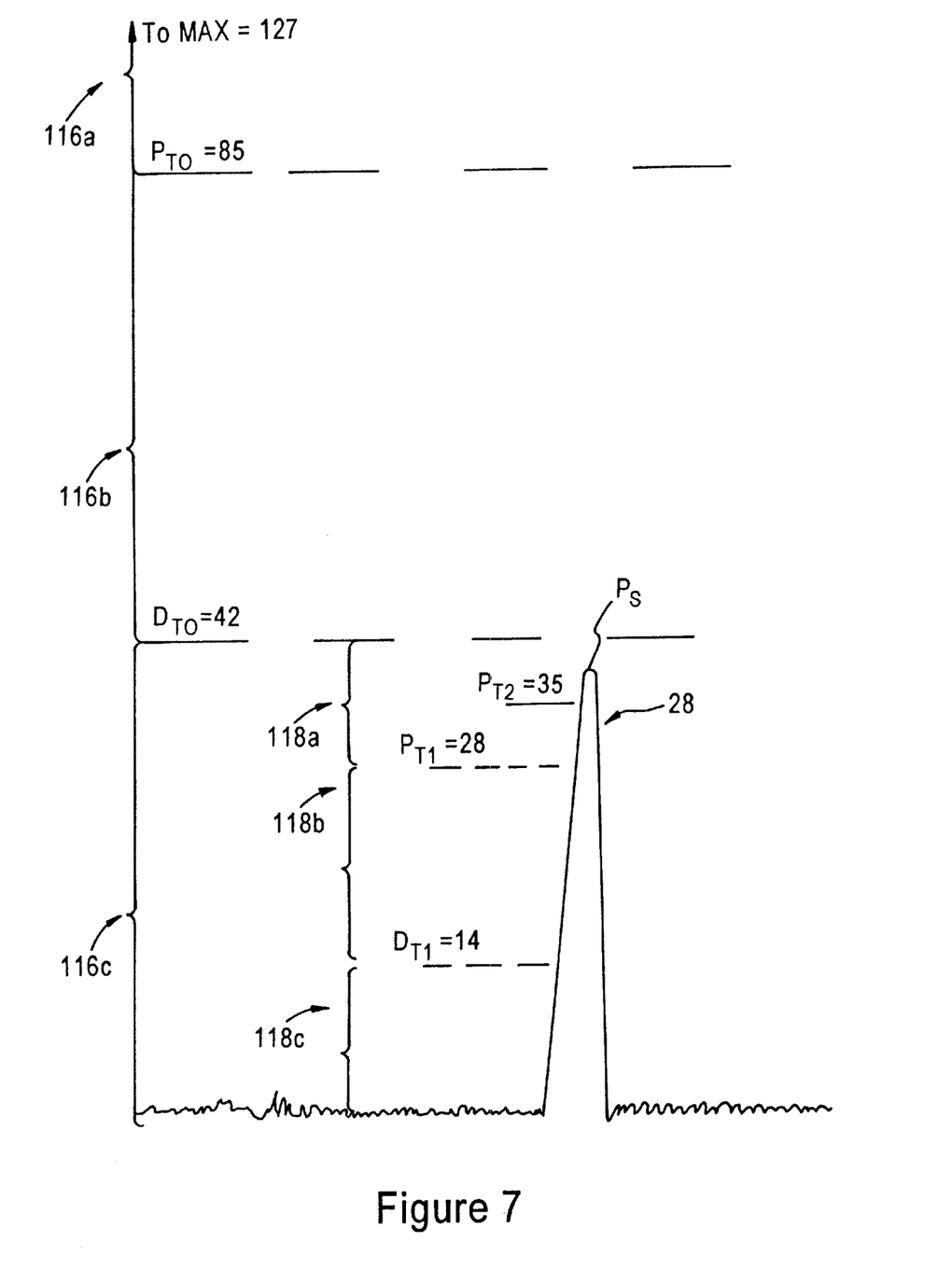
FIG. 7 is a diagram illustrating comparison of an envelope signal to different threshold levels according to an embodiment of the present invention.

FIG. 7 is a diagram illustrating an envelope signal 28 and detection regions 116 within the dynamic range of the slicers 38 for determining a peak threshold value according to an embodiment of the present invention. As described below, the digital controller 41 sets the peak threshold to a first detection range threshold value (e.g., $P_{T0}$=85). The digital controller 41 also sets the data threshold ($D_{T0}$) to a second detection range threshold value (e.g., $D_{T0}$=42). The prescribed dynamic range threshold values ($P_{T0}$ and $D_{T0}$) define a group of primary detection regions 116 for detecting the peak ($P_S$) of the envelope signal 28 within a dynamic range of the comparator circuits 38a and 38b. As shown in FIG. 7, a first primary detection region 116a cover the range of 85 to maximum value of 127; primary detection region 116b covers the range 42 to 84; and detection region 116c covers the range 0 to 41.

Hence, the digital controller 41 in step 110 of FIG. 5 begins detecting the peak of the envelope signal 28d during the second portion 94 of the AID interval 90 by setting the peak and data thresholds to establish the primary detection regions 116. The digital controller 41 determines the presence of the peak ($P_S$) based on the output values (PE, DE) of slicers 38a and 38b relative to the first and second detection range threshold values, respectively.

Once the digital controller 41 identifies the primary detection region having the peak ($P_S$) of the envelope signal 28d, the digital controller 41 resets the peak threshold (P) and the data threshold (D) to third and fourth detection range threshold values ($P_{T1}$, $D_{T1}$), to define a group of second detection regions 118 within the primary detection region 116 identified as having the peak ($P_S$) of the envelope signal 28d (step 112). The digital controller 41 then identifies the secondary detection region 118 having the peak ($P_S$) of the envelope pulse 28e based on the output values of the slicers 38a and 38b.

Once the digital controller 41 identifies the secondary detection region 118 having the peak ($P_S$) of the envelope signal 28e, the digital controller 41 then uses binary search techniques in step 114 using the last three AID envelope pulses 28f, 28g and 28h in group 98. The binary search is executed in step 114 based on the need for a digital phase locked loop (DPLL) in the digital controller 41 to have sufficient training time during interval 98 to acquire phase information from the envelope pulses 28 prior to reception of the data pulse 28i. Hence, the peak slice level is set to about the middle of the secondary detection region (e.g., 118a) having the peak ($P_S$), for example $P_{T2}$32 35 in FIG. 7. The data slice level is set to equal ½ the peak level ($D_{T2}=P_{T2}/2$). The use of the binary search yields sufficient information for the data slice to be able to acquire phase for the DPLL. In addition, any changes in the data slice levels during the binary search do not adversely effect acquisition of phase information by the DPLL. Hence, the second portion 94 of the AID interval 90 includes a first portion 96 used for ternary search, followed by binary search in portion 98 to enable training of the DPLL.

Figure 6:
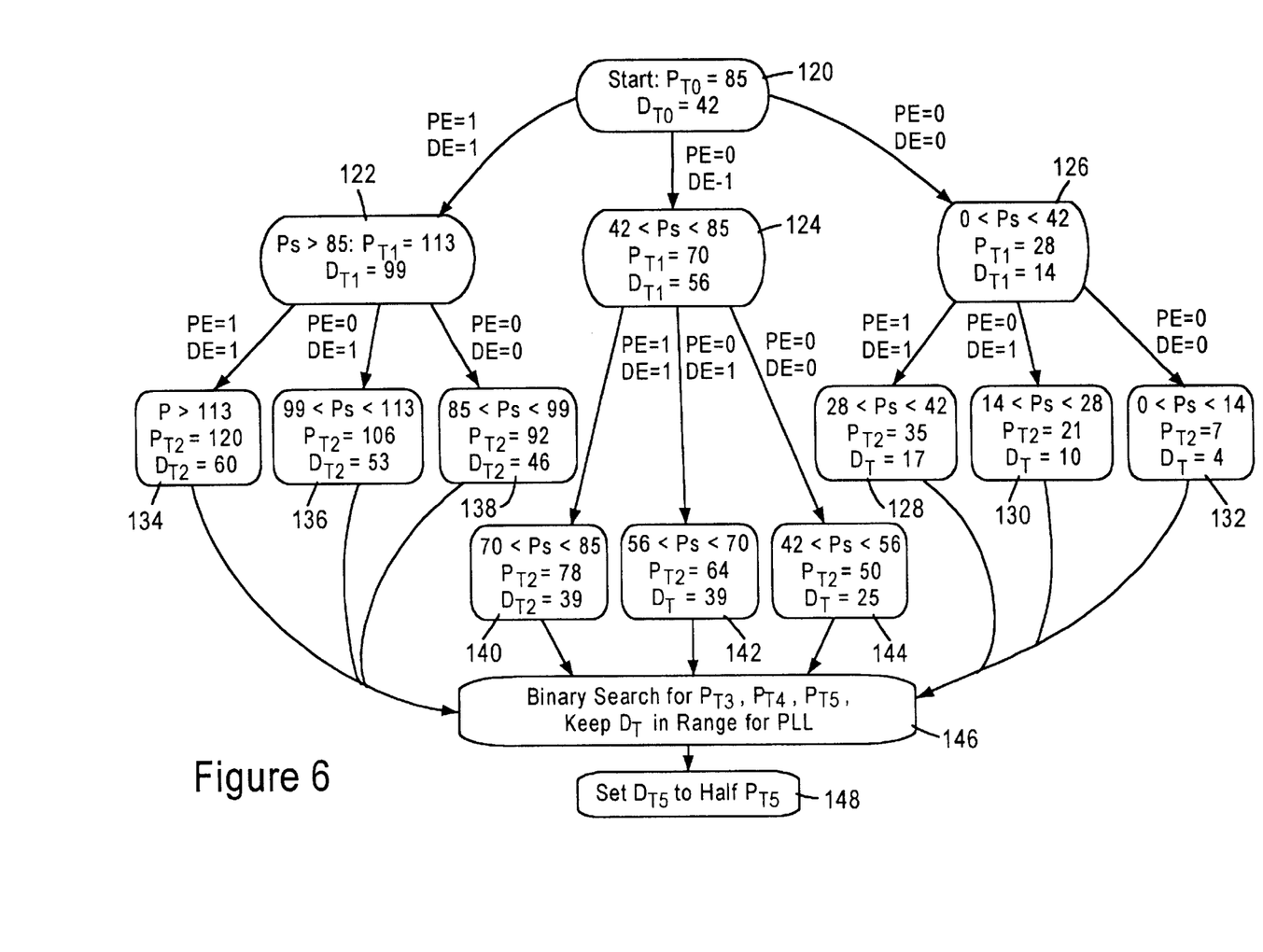
FIG. 6 is a state diagram illustrating the states of the digital controller of FIG. 3 according to the method of FIG. 5.

FIG. 6 is a state diagram illustrating the digital controller 41 executing steps 110, 112, and 114 of FIG. 5. As shown in FIG. 6, the digital controller 41 beings in state 120, which corresponds to step 110 of FIG. 5. The digital controller 41 then moves to either state 122, 124, or 126, based on whether the peak ($P_S$) of AID envelope pulse 28d exceeds the detection range threshold values ($P_{T0}$, $D_{T0}$) as determined by the slicer values (PE, DE). For example, following the example of FIG. 7, the digital controller 41 moves from state 120 to state 126 in response to the comparator 38a and 38b outputting comparison values equal to zero (PE=0, DE=0). States 122, 124, and 126 are executed in response to the peak of the envelope signal 28d being detected in primary detection region 116a, 116b and 116c based on slicer values (PE=1, DE=1), (PE=0, DE=1), (PE=0, DE=0), respectively.

The digital controller 41 selectively adjusts the peak and data slice values to the detection range threshold values ($P_{T1}$ and $D_{T1}$), respectively, to define the secondary detection regions for detecting the peak of the envelope signal within the identified primary detection range in having the peak. Using the example of FIG. 7, the digital controller 41 sets the peak and data slice levels to $P_{T1}$=28 and $D_{T1}$=14, respectively, in state 126 to establish the secondary detection regions 118 within primary detection region 116.

The digital controller 41 then identifies one of the secondary detection regions 118 as having the peak ($P_S$) of the envelope signal 28e based on the slicer values PE, DE. As shown in the example of FIG. 7, the digital controller 41 identifies the secondary detection region 118a having the peak ($P_S$) of the envelope pulse 28e based on the peak slicer value (PE=0) and the data slicer value (DE=1) from slicers 38a and 38b, respectively. Hence, the digital controller 41 moves to state 128 and sets the peak threshold to $P_{T2}$=35 and the data threshold to $D_{T2}$=17 to begin detection of peak and data slice levels for the next envelope pulse 28f.

Hence, the digital controller 41 moves to states 128, 130, or 132 based on detection of the peak within the secondary detection regions 118a, 118b, or 118c, respectively. Similar states are established for primary detection region 116a, where the digital controller 41 may selectively move to either state 134, 136, or 138 based on detecting a peak in a secondary detection region and primary region 116a. Alternatively, the digital controller 41, upon detecting a peak in primary region 116b, moves from state 124 to state 140, 142, or 144 based on the relative detection of the peak within the secondary detection regions in the primary region 116b.

Hence the disclosed ternary search technique enables the digital controller to select 1 of 9 possible secondary detection regions using the 2 AID envelope pulses 28d and 28e, resulting in resolution of better than 3 bits of the peak threshold value, and illustrated below in table 1.

TABLE 1

| $P_T$ (Decimal) | $P_T$ (Binary) |
| --- | --- |
| 120 | 1111 000 |
| 106 | 1101 010 |
| 92 | 1010 100 |
| 78 | 1001 110 |
| 64 | 1000 000 |
| 50 | 0110 100 |
| 35 | 0100 011 |
| 21 | 0010 101 |
| 7 | 0000 111 |

Once the digital controller 41 identifies the secondary detection region having the peak, a binary search is then executed in state 146. Table 2 illustrates the progression of identifying the peak threshold according to the example of FIG. 7, where the peak value is 38 decimal ($P_S$=38).

TABLE 2

| |
| --- |
| $P_{T0}$ = 85 |
| $P_{T1}$ = 28 |
| $P_{T2}$ = 35 |
| $P_{T3}$ = 39 |
| $P_{T4}$ = 37 |
| $P_{T5}$ = 38 |

Once the digital controller determines the final peak threshold value, the digital controller 41 sets the final data threshold value in state 148 as one half of the peak value.

According to the disclosed embodiment, a first portion of the AID interval is used to determine a optimum input amplifier gain setting to improve signal to noise ratio. In addition, peak and data slice levels are determined in a second portion of the AID interval by performing a ternary search using more than one slicer level during threshold level adaptation level. Hence, the disclosed arrangement enables a determination of optimum peak and data slicer threshold levels using techniques more efficient than conventional binary search techniques.

Although the disclosed arrangement uses a ternary search, alternative search techniques may be used, for example, a flash search using a substantially larger number of comparators.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A network station configured for receiving network signals from another network station via a telephone line medium, the network station comprising:

an input amplifier for selectively amplifying a received network signal according to a selected one of a plurality of gain settings and outputting an amplified network signal;

an envelope detector configured for outputting an envelope signal in response to the amplified network signal;

first and second comparator circuits configured for outputting first and second comparison signals indicating whether the envelope signal exceeds first and second threshold values, respectively; and a digital controller configured for setting the selected one gain setting and the first and second threshold values within a prescribed access identifier interval specified by a prescribed number of the received network signals from the telephone line medium, the digital controller determining the selected one gain setting during a first portion of the prescribed access identifier interval, and a peak threshold value and data threshold value for the respective first and second threshold values during a second portion of the prescribed access identifier interval, the peak threshold value substantially corresponding to a detected peak of the envelope signal.

2. The network station of claim 1, wherein the digital controller initially sets the input amplifier to a maximum gain setting, the digital controller successively setting a corresponding significant bit of the maximum gain setting to an adjusted gain setting based on successive detection of a saturated envelope signal generated in response to amplifying the received network signal according to the adjusted gain setting.

3. The network station of claim 2, wherein the digital controller sets the selected one gain setting based on successively setting a prescribed number of significant bits for the adjusted gain setting.

4. The network station of claim 3, wherein the digital controller sets the selected one gain setting based on three envelope signal pulses as corresponding to the prescribed number of significant bits and the first portion.

5. The network station of claim 1, wherein the digital controller sets the first and second threshold values to first and second detection range threshold values during the second portion of the prescribed access identifier interval, the first and second detection range threshold values defining a group of primary detection regions for detecting the peak of the envelope signal within a dynamic range of the first and second comparator circuits.

6. The network station of claim 5, wherein the digital controller selectively adjusts the first and second threshold values to third and fourth detection range threshold values based on a comparison by the first and second comparator circuits of a first envelope signal output in the second portion and relative to the first and second detection range threshold values, the third and fourth detection range threshold values defining a group of secondary detection regions for detecting the peak of the envelope signal within an identified one of the primary detection regions.

7. The network station of claim 6, wherein the digital controller determines the peak threshold value based on a comparison by the first and second comparator circuits of a second envelope signal successively following the first envelope signal in the second portion and relative to the third and fourth detection range threshold values, the digital controller identifying one of the secondary detection regions as having the peak of the envelope signal.

8. The network station of claim 7, wherein the second portion includes five successive envelope pulses initiated by the first and second envelope signals, the one secondary detection region identified in response to the second successive envelope pulse.

9. The network station of claim 8, wherein the digital controller determines the first threshold value by executing binary search within the one secondary detection region using a remaining portion of the five successive envelope pulses, the digital controller setting the second threshold to within a prescribed range during the remaining portion.

10. The network station of claim 1, wherein the prescribed access identifier interval is specified by eight successive envelope signals, the digital controller setting the first portion to up to three successive envelope pulses and the second portion to at least five successive envelope pulses.

11. The network station of claim 10, wherein the digital controller determines a detection region for the detected peak of the envelope signal based on at least the first two of the five successive envelope pulses.

12. The network station of claim 11, wherein the digital controller determines the first and second threshold values based on a binary search in the detection region using the last three of the five successive envelope pulses.

13. The network station of claim 11, wherein the digital controller determines the detection region from one of nine detection regions within a dynamic range of the first and second comparator circuits.

14. The network station of claim 1, further comprising a digital to analog converter for outputting first and second comparison signals to the first and second comparator circuits in response to the first and second threshold values, respectively.

15. A method of configuring a network station transceiver for reception, from a telephone line medium, of network data signals contiguously following a prescribed number of network access identifier signal pulses defining an access identifier interval, the method comprising:

determining a gain setting for an input amplifier, configured for outputting an amplified network signal to an envelope detector, within a first portion of the access identifier interval; and determining a data threshold value and a peak threshold value for first and second comparator circuits, configured for identifying whether an envelope signal generated based on the amplified network signal exceeds threshold values supplied to the first and second comparator circuits, within a second portion of the access identifier interval.

16. The method of claim 15, wherein the step of determining a gain setting includes:

setting the input amplifier to an initial maximum gain setting; and successively adjusting corresponding significant bits of the maximum gain setting based on successive detection of a saturated envelope signal output by the envelope detector, the significant bits corresponding to a first number of the network access identifier signal pulses in the first portion.

17. The method of claim 16, wherein the step of determining a data threshold value and a peak threshold value includes determining a peak detection region from a plurality of detection regions within a dynamic range of the comparator circuits, the peak detection region corresponding to a number of significant bits for the peak threshold value, using a first number of the network access identifier signal pulses in the second portion and less than the number of significant bits.

18. The method of claim 17, wherein the step of determining a data threshold value and a peak threshold value further comprises executing a binary search within the peak detection region for the detected peak using a second number of the network access identifier signal pulses in the second portion.

19. The method of claim 18, wherein the step of determining a data threshold value and a peak value further comprises setting the data threshold value to within a prescribed range during the binary search.

* * * * *

UNITED STATES PATENT AND TRADEMARK OFFICE
CERTIFICATE OF CORRECTION

PATENT NO.    : 6,438,184 B1
DATED         : August 20, 2002
INVENTOR(S)   : Colin Nayler It is certified that error appears in the above-identified patent and that said Letters Patent is hereby corrected as shown below:

Title page,
Item [73], Assignee: change "Sunnyvale Micro Devices, Inc." to -- Advanced Micro Devices, Inc. --

Signed and Sealed this

Fourteenth Day of January, 2003

JAMES E. ROGAN
*Director of the United States Patent and Trademark Office*